United States Patent
Chung et al.

(10) Patent No.: US 12,039,789 B2
(45) Date of Patent: Jul. 16, 2024

(54) SYSTEM AND METHOD TO DETECT PROPER SEATBELT USAGE AND DISTANCE

(71) Applicant: MAGNA ELECTRONICS, LLC, Southfield, MI (US)

(72) Inventors: Caroline Chung, Southfield, MI (US); Frank Judge, Southfield, MI (US); Thomas Herbert, Southfield, MI (US); Mitchell Pleune, Southfield, MI (US)

(73) Assignee: MAGNA ELECTRONICS, LLC, Southfield, MI (US)

( * ) Notice: Subject to any disclaimer, the term of this patent is extended or adjusted under 35 U.S.C. 154(b) by 0 days.

(21) Appl. No.: 17/343,366

(22) Filed: Jun. 9, 2021

(65) Prior Publication Data
US 2022/0398404 A1    Dec. 15, 2022

(51) Int. Cl.
*G06V 20/59*    (2022.01)
*B60R 22/48*    (2006.01)
(Continued)

(52) U.S. Cl.
CPC .............. *G06V 20/59* (2022.01); *B60R 22/48* (2013.01); *G06T 7/50* (2017.01); *G06T 7/73* (2017.01);
(Continued)

(58) Field of Classification Search
CPC ........ G06V 20/59; G06V 10/28; G06V 10/30; G06V 10/44; B60R 22/48;
(Continued)

(56) References Cited

U.S. PATENT DOCUMENTS

| 10,864,826 B2 | 12/2020 | Kuepper et al. |
| 2013/0077829 A1 | 3/2013 | Cramblitt |

(Continued)

FOREIGN PATENT DOCUMENTS

| CN | 110659649 | * | 1/2020 | ............... G06K 9/34 |
| JP | 2007055294 | * | 3/2007 | ............. B60R 22/12 |

(Continued)

OTHER PUBLICATIONS

Search Reporting regarding corresponding PCT App. No. PCT/US22/28374; mailed Sep. 13, 2022.

*Primary Examiner* — Zhiyu Lu
(74) *Attorney, Agent, or Firm* — DICKINSON WRIGHT PLLC (57) ABSTRACT

A system and method for detecting seatbelt positioning includes capturing, by a camera, a near infrared (NIR) image of an occupant, applying a median filter to the NIR image to remove glints; converting the NIR image to a black-and-white image, scanning across the black-and-white (B/W) image to detect a plurality of transitions between black and white segments corresponding to stripes extending lengthwise along a length of the seatbelt, and using detections of the plurality of transitions to indicate a detection of the seatbelt. Converting the NIR image to the black-and-white image may include using a localized binary threshold to determine whether a given pixel in the B/W image should be black or white based on whether a corresponding source pixel within the NIR image is brighter than an average of nearby pixels within a predetermined distance of the corresponding source pixel.

20 Claims, 7 Drawing Sheets

(51) Int. Cl.
  *G06T 7/50* (2017.01)
  *G06T 7/73* (2017.01)
  *G06V 10/28* (2022.01)
  *G06V 10/30* (2022.01)
  *G06V 10/44* (2022.01)

(52) U.S. Cl.
  CPC .............. *G06V 10/28* (2022.01); *G06V 10/30* (2022.01); *G06V 10/44* (2022.01); *B60R 2022/4841* (2013.01); *B60R 2022/485* (2013.01); *G06T 2207/10048* (2013.01); *G06T 2207/30196* (2013.01); *G06T 2207/30268* (2013.01)

(58) Field of Classification Search
  CPC ...... B60R 2022/4841; B60R 2022/485; G06T 7/50; G06T 7/73; G06T 2207/10048; G06T 2207/30196; G06T 2207/30268
  See application file for complete search history.

(56) References Cited

U.S. PATENT DOCUMENTS

| | | | |
|---|---|---|---|
| 2015/0105976 A1* | 4/2015 | Shikii | B60K 28/04 701/36 |
| 2016/0159320 A1 | 6/2016 | Andreen | |
| 2018/0211123 A1 | 7/2018 | Yasuda et al. | |
| 2018/0326944 A1* | 11/2018 | Cech | G01S 11/00 |
| 2019/0258878 A1 | 8/2019 | Koivisto et al. | |
| 2019/0375360 A1* | 12/2019 | Hiroki | B60R 21/01534 |
| 2020/0055480 A1 | 2/2020 | Herbert et al. | |
| 2020/0210696 A1 | 7/2020 | Hou et al. | |
| 2020/0320318 A1* | 10/2020 | Ramaglia | G06V 20/59 |

FOREIGN PATENT DOCUMENTS

| | | | | |
|---|---|---|---|---|
| JP | 2010167860 | * | 8/2010 | ............. B60R 22/48 |
| JP | 2017161405 | * | 9/2017 | ............ B06R 21/015 |
| JP | 2018206295 | * | 12/2018 | ............... G06T 7/20 |

* cited by examiner

SYSTEM AND METHOD TO DETECT PROPER SEATBELT USAGE AND DISTANCE

BACKGROUND

1. Field of the Invention

The present invention generally relates systems and methods for detecting proper seatbelt usage and distance to an occupant using a vision system, such as an near-infrared (NIR) camera.

2. Description of Related Art

Cameras and other image detection devices have been utilized to detect one or more objects. Control systems that are in communication with these cameras can receive images captured by the cameras and process these images. The processing of these images can include detecting one or more objects found in the captured images. Based on these detected objects, the control system may perform some type of action in response to these detected variables.

Conventional systems for detecting seatbelt usage typically rely upon a seat belt buckle switch. However, those conventional systems are unable to detect if the seatbelt is properly positioned or if the seat belt buckle is being spoofed. Seat track sensors are typically used to determine distance to an occupant of a motor vehicle. However, such use of seat track sensors do not account for body position of the occupant relative to the seat.

SUMMARY

In one example, a method for detecting seatbelt positioning includes capturing, by a camera, a near infrared (NIR) image of an occupant. The method also includes converting the NIR image to a black-and-white image; and scanning across the black-and-white image to detect a plurality of transitions between black and white segments corresponding to stripes extending lengthwise along a length of the seatbelt, and using detections of the plurality of transitions to indicate a detection of the seatbelt.

In another example, a system for detecting seatbelt positioning, comprises a seatbelt having a plurality of stripes extending lengthwise along a length thereof, the plurality of stripes being arranged in an alternating pattern of bright and dark in near-infrared. The system also comprises a camera configured to capture a near infrared (NIR) image of an occupant wearing the seatbelt; and a processor in communication with the camera and programmed to receive the NIR image of the occupant wearing the seatbelt and to determine a position of the seatbelt based on detecting transitions corresponding to the alternating pattern of the stripes.

Further objects, features, and advantages of this invention will become readily apparent to persons skilled in the art after a review of the following description, with reference to the drawings and claims that are appended to and form a part of this specification.

DETAILED DESCRIPTION

Figure 1:
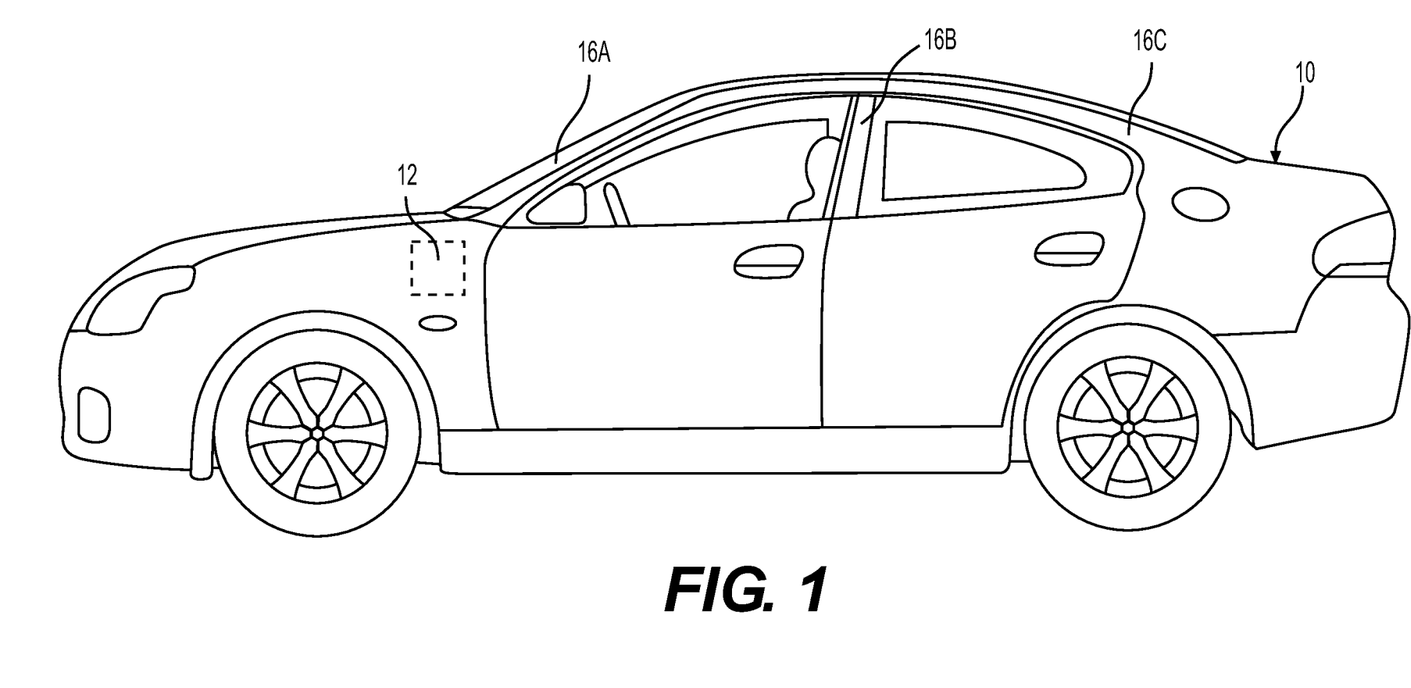
FIG. 1 illustrates a vehicle having a system for detecting proper seatbelt usage and for detecting distance to the seatbelt.

Referring to FIG. 1, illustrated is a vehicle 10 having a seatbelt detection system 12 for detecting proper seatbelt usage and/or for detecting distance to the seatbelt. In this example, the seatbelt detection system 12 has been incorporated within the vehicle 10. However, it should be understood that the seatbelt detection system 12 could be a standalone system separate from the vehicle 10. In some embodiments, the seatbelt detection system 12 may employ some or all components existing in the vehicle 10 for other systems and/or for other purposes, such as for driver monitoring in an advanced driver assistance system (ADAS). Thus, the seatbelt detection system 12 of the present disclosure may be implemented with very low additional costs.

As to the vehicle 10, the vehicle 10 is shown in FIG. 1 as a sedan type automobile. However, it should be understood that the vehicle 10 may be any type of vehicle capable of transporting persons or goods from one location to another. As such, the vehicle 10 could, in addition to being a sedan type automobile, could be a light truck, heavy-duty truck, tractor-trailer, tractor, mining vehicle, and the like. Also, it should be understood that the vehicle 10 is not limited to wheeled vehicles but could also include non-wheeled vehicles, such as aircraft and watercraft. Again, the term vehicle should be broadly understood to include any type of vehicle capable of transporting persons or goods from one location to another and it should not be limited to the specifically enumerated examples above.

Figure 2:
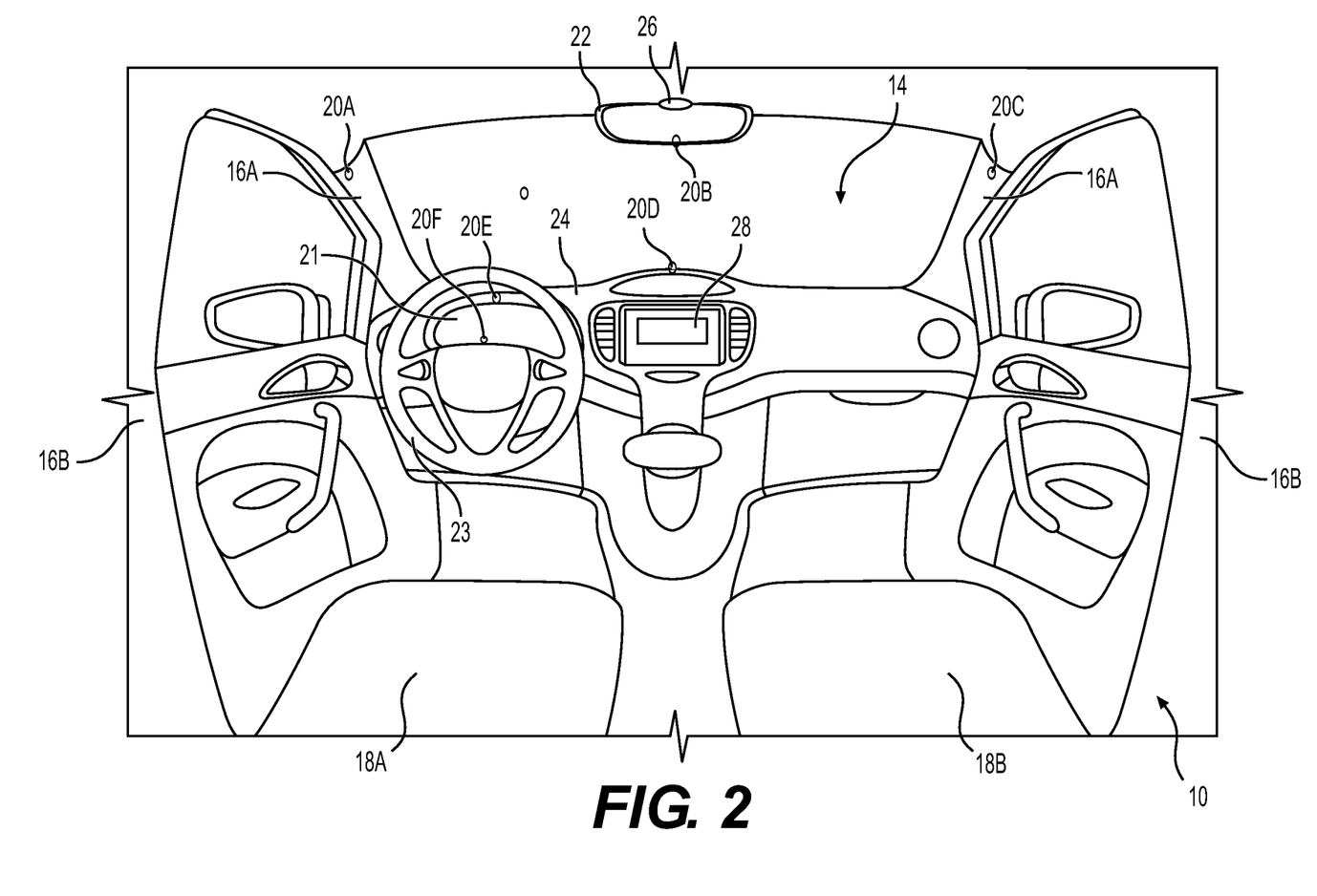
FIG. 2 illustrates a forward looking view of a cabin of the vehicle having a system for detecting proper seatbelt usage and for detecting distance to the seatbelt.

Referring to FIG. 2, a cabin 14 of the vehicle 10 is shown. As it is well understood in the art, the cabin 14 is essentially the interior of the vehicle 10 wherein occupants and/or goods are located when the vehicle is in motion. The cabin 14 of the vehicle may be defined by one or more pillars that structurally define the cabin 14. For example, in FIG. 2, A-pillars 16A and B-pillars 16B are shown. FIG. 1 further illustrates that there may be a third pillar or a C-pillar 16C. Of course, it should be understood that the vehicle 10 may contain any one of a number of pillars so as to define the cabin 14. Additionally, it should be understood that the vehicle 10 may be engineered so as to remove these pillars, essentially creating an open-air cabin 14 such as commonly found in automobiles with convertible tops.

Located within the cabin 14 are seats 18A and 18B. The seats 18A and 18B are such that they are configured so as to support an occupant of the vehicle 10. The vehicle 10 may have any number of seats. Furthermore, it should be understood that the vehicle 10 may not have any seats at all.

The vehicle 10 may have one or more cameras 20A-20F located and mounted to the vehicle 10 so as to be able to have a field a view of at least a portion of the cabin 14 that function as part of a vision system. As such, the cameras 20A-20F may have a field of view of the occupants seated in the seats 18A and/or 18B. Here, cameras 20A and 20C are located on the A-pillars 16A. Camera 20B is located on a rearview mirror 22. Camera 20D may be located on a dashboard 24 of the vehicle 10. Camera 20E and 20F may focus on the driver and/or occupant and may be located adjacent to the vehicle cluster 21 or a steering wheel 23, respectively. Of course, it should be understood that any one of a number of different cameras may be utilized. As such, it should be understood that only one camera may be utilized or numerous cameras may be utilized. Furthermore, the cameras 20A-20F may be located and mounted to the vehicle 10 anywhere so long as to have a view of at least a portion of the cabin 14.

The cameras 20A-20F may be any type of camera capable of capturing visual information. This visual information may be information within the visible spectrum, but could also be information outside of the visible spectrum, such as infrared or ultraviolet light. Here, the cameras 20A-20F are near infrared (NIR) cameras capable of capturing images generated by the reflection of near infrared light. Near infrared light may include any light in the near-infrared region of the electromagnetic spectrum (from 780 nm to 2500 nm). However, the seatbelt detection system 12 of the present disclosure may be configured to use a specific wavelength or range of wavelengths within the near-infrared region.

The source of this near-infrared light could be a natural source, such as the sun, but could also be an artificial source such as a near-infrared light source 26. The near-infrared light source 26 may be mounted anywhere within the cabin 14 of the vehicle 10 so as long as to be able to project near-infrared light into at least a portion of the cabin 14. Here, the near-infrared light source 26 is mounted to the rearview mirror 22 but should be understood that the near-infrared light source 26 may be mounted anywhere within the cabin 14. Additionally, it should be understood that while only one near-infrared light source 26 is shown, there may be more than one near-infrared light source 26 located within the cabin 14 of the vehicle 10.

Also located within the cabin 14 may be an output device 28 for relaying information to one or more occupants located within the cabin 14. Here, the output device 28 is shown in a display device so as to convey visual information to one or more occupants located within the cabin 14. However, it should be understood that the output device 28 could be any output device capable of providing information to one or more occupants located within the cabin 14. As such, for example, the output device may be an audio output device that provides audio information to one or more occupants located within the cabin 14 of a vehicle 10. Additionally, should be understood that the output device 28 could be a vehicle subsystem that controls the functionality of the vehicle.

Figure 3:
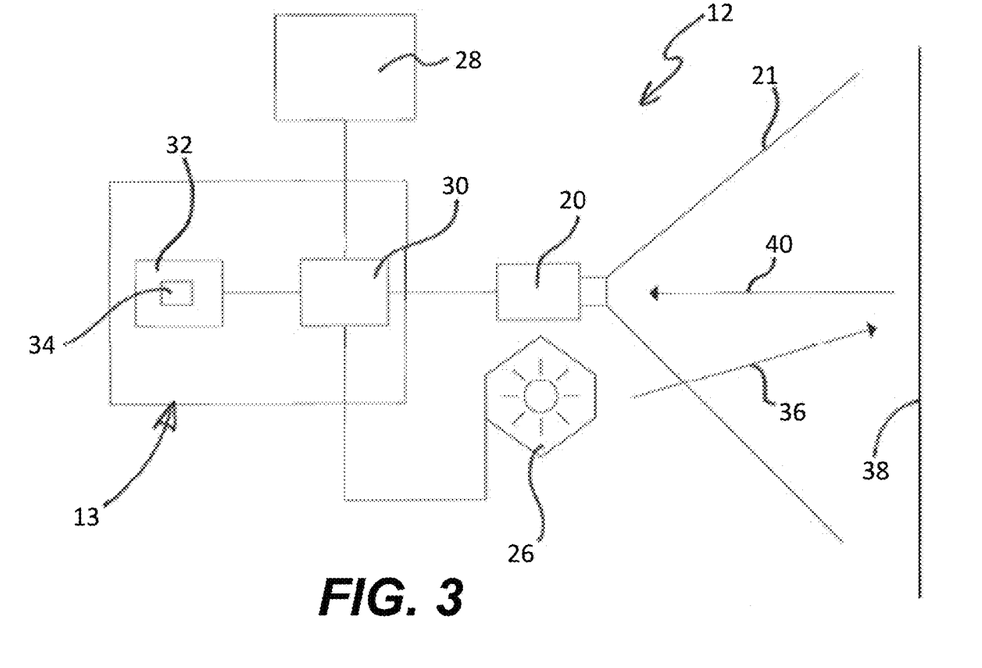
FIG. 3 illustrates a block diagram of the system for detecting proper seatbelt usage and for detecting distance to the seatbelt.

Referring to FIG. 3, a more detailed illustration of the seatbelt detection system 12 is shown. Here, the system 12 includes a control system 13 having a processor 30 in communication with a memory 32 that contains instructions 34 for executing any one of a number of different methods disclosed in this specification. The processor 30 may include a single stand-alone processor or it may include two or more processors, which may be distributed across multiple systems working together. The memory 32 may be any type of memory capable of storing digital information. For example, the memory may be solid-state memory, magnetic memory, optical memory, and the like. Additionally, it should be understood that the memory 32 may be incorporated within the processor 30 or may be separate from the processor 30 as shown.

The processor 30 may also be in communication with a camera 20. The camera 20 may be the same as cameras 20A-20F shown and described in FIG. 2. The camera 20, like the cameras 20A-20F in FIG. 2, may be a near-infrared camera. The camera 20 may include multiple physical devices, such as cameras 20A-20F illustrated in FIG. 2. The camera 20 has a field of view 21.

The near-infrared light source 26 may also be in communication with the processor 30. When activated by the processor 30, the near-infrared light source 26 projects near-infrared light 36 to an object 38 which may either absorb or reflect near-infrared light 40 towards the camera 20 wherein the camera can capture images illustrating the absorbed or reflected near-infrared light 40. These images may then be provided to the processor 30.

The processor 30 may also be in communication with the output device 28. The output device 28 may include a visual and/or audible output device capable of providing information to one or more occupants located within the cabin 14 of FIG. 2. Additionally, it should be understood that the output device 28 could be a vehicle system, such as a safety system that may take certain actions based on input received from the processor 30. For example, the processor 30 may instruct the output device 28 to limit or minimize the functions of the vehicle 10 of FIG. 1. As will be explained later in this specification, one of the functions that the seatbelt detection system 12 may perform is detecting if an occupant is properly wearing a safety belt. If the safety belt is not properly worn, the processor 30 could instruct the output device 28 to limit the functionality of the vehicle 10, such that the vehicle 10 can only travel at a greatly reduced speed.

Figure 4:
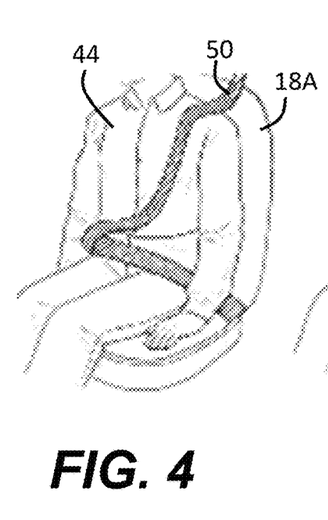
FIG. 4 illustrates a first example of improper seatbelt positioning.
Figure 5:
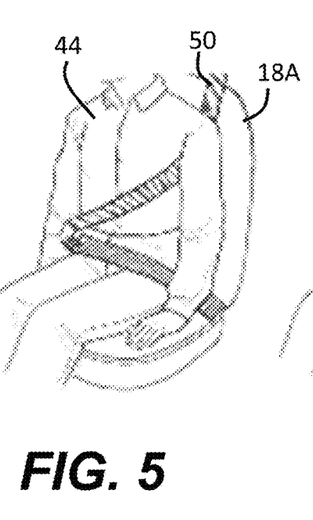
FIG. 5 illustrates a second example of improper seatbelt positioning.
Figure 6:
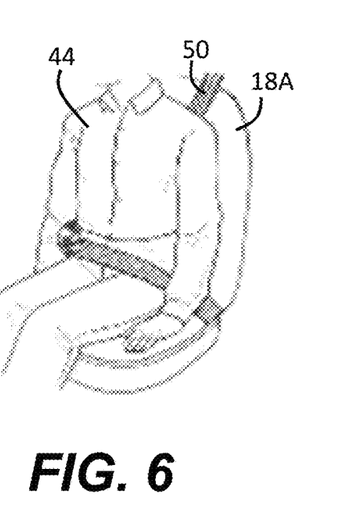
FIG. 6 illustrates a third example of improper seatbelt positioning.

FIG. 4 illustrates a first example of improper seatbelt positioning, showing a seatbelt 50 that is ill-adjusted on an occupant 44 sitting on a seat 18A of the vehicle 10. The ill-adjusted seatbelt 50 in this example, drapes loosely over the shoulder of the occupant 44. FIG. 5 illustrates a second example of improper seatbelt positioning, showing the seatbelt 50 passing under the armpit of the occupant 44. FIG. 6 illustrates a third example of improper seatbelt positioning, showing the seatbelt 50 passing behind the back of the occupant 44. The seatbelt detection system may detect other examples of improper seatbelt positioning, such as a seatbelt that is missing or which is not worn by the occupant 44, even in cases where the buckle is spoofed (e.g. by plugging-in the buckle with the seatbelt behind the occupant 44 or by placing a foreign object into the buckle latch).

Figure 7A:
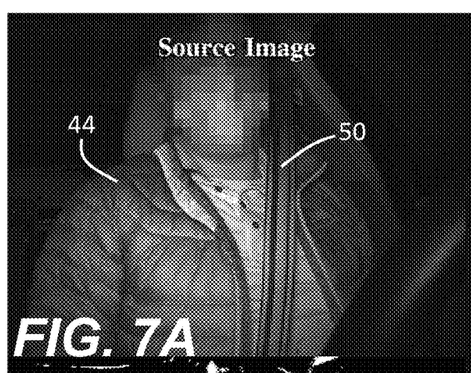
FIG. 7A shows a near infrared (NIR) image of a person wearing a seatbelt in accordance with an aspect of the present disclosure.
Figure 7B:
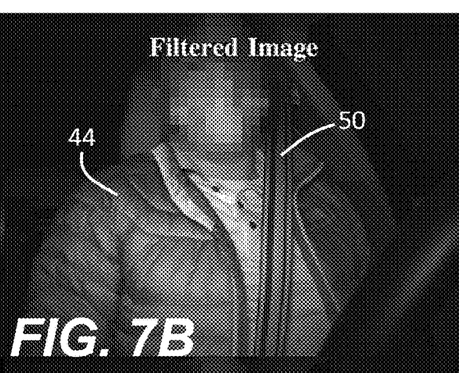
FIG. 7B shows a filtered image based on the NIR image of FIG. 7A, in accordance with the present disclosure.
Figure 7C:
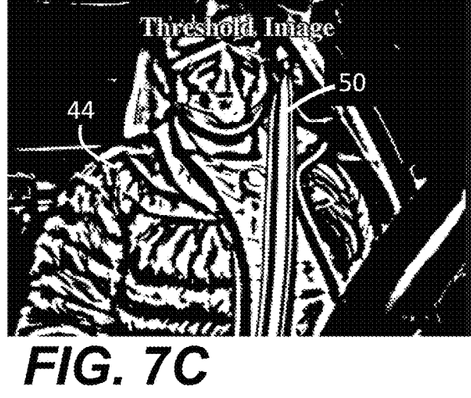
FIG. 7C shows a Black/White image based on the NIR image of FIG. 7A, in accordance with the present disclosure.
Figure 7D:
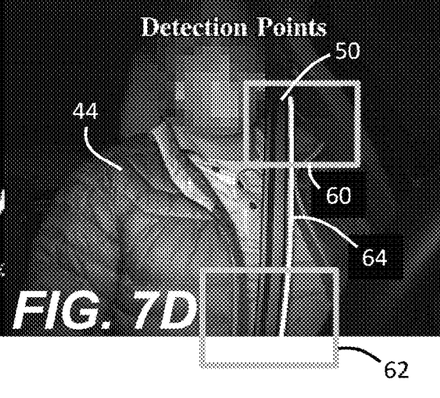
FIG. 7D shows an image based on the NIR image of FIG. 7A, illustrating detection points, in accordance with the present disclosure.

FIG. 7A shows a near infrared (NIR) image of an occupant 44 wearing a seatbelt 50 in accordance with an aspect of the present disclosure. This may represent an image captured by the camera 20 and received by the processor 30. In some embodiments, the occupant 44 may be a driver of the vehicle 10. However, the occupant 44 could also be a passenger in the vehicle 10. FIG. 7B shows a filtered image based on the NIR image of FIG. 7A; FIG. 7C shows a Black/White image based on the NIR image of FIG. 7A; and FIG. 7D shows an image based on the NIR image of FIG. 7A, illustrating detection points, in accordance with the present disclosure. Specifically, FIG. 7D shows the seatbelt 50 passing through each of a first region of interest (ROI) 60 and a second ROI 62. The first ROI 60 may be located above a shoulder of the occupant 44, and the second ROI 62 may be located below and to the left of the first ROI. The second ROI 62 may correspond to a central region of the occupant's 44 torso. The ROIs 60, 62 may each have a fixed location within the field of view 21 of the camera 20. Alternatively, the system 12 may adjust the positions of one or both of the ROIs 60, 62 based on a detected location of the occupant 44 within the field of view 21 of the camera 20.

Figure 8A:
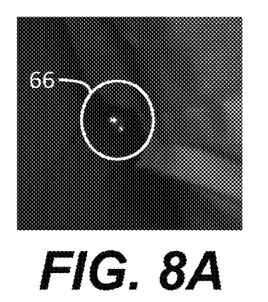
FIG. 8A shows an enlarged section of an NIR image.
Figure 8B:
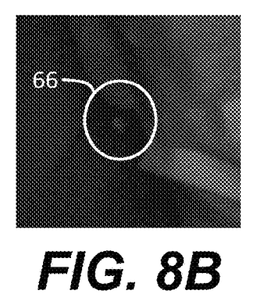
FIG. 8B shows a filtered image of the enlarged section of FIG. 8A.

FIG. 8A shows an enlarged section of an NIR image, including a part of an occupant 44, and FIG. 8B shows a filtered image of the enlarged section of FIG. 8A. FIGS. 8A-8B illustrate removal of glints, which appear as small bright regions of the NIR image. The glints in this example are on an earring worn by the occupant 44. However, the glints may come from other sources, such as a frayed thread or a piece of lint or other material. The presence of glints on or near the seatbelt 50 could otherwise interfere with subsequent processing steps, and could reduce effectiveness of the proper operation of the seatbelt detection system 12.

Figure 9:
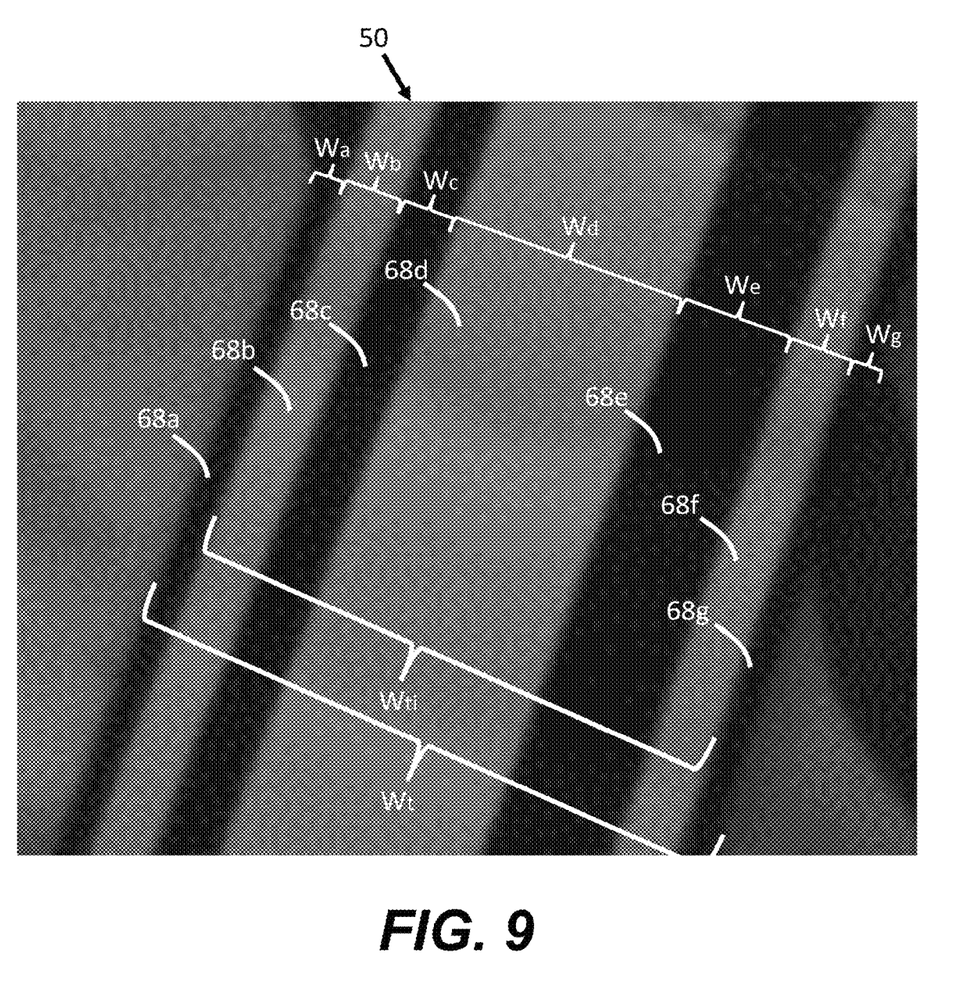
FIG. 9 shows a close-up NIR image of a seatbelt with an asymmetric stripe pattern, in accordance with the present disclosure.

FIG. 9 shows a close-up NIR image of a seatbelt 50 with an asymmetric stripe pattern, in accordance with the present disclosure. Specifically, the seatbelt 50 includes a plurality of stripes 68a-68g extending lengthwise along a length of the seatbelt 50. The stripes 68a-68g have alternating high and low brightness in the NIR image. The illustrated seatbelt 50 includes seven (7) stripes 68a-68g. However, the seatbelt 50 may have fewer or a greater number of the stripes 68a-68g. The stripes 68a-68g are arranged in an asymmetric pattern, with each of the stripes 68a-68g having a corresponding width $W_a$-$W_g$ in a direction perpendicular to the lengthwise dimension of the seatbelt 50. The widths $W_a$-$W_g$ of the stripes 68a-68g sum to a total width Wt of the seatbelt 50. The stripes 68a-68g include two outermost stripes 68a, 68g surrounding a plurality of interior stripes 68b-68f, which together define a total interior width $W_{ti}$. The widths $W_a$-$W_g$ of the stripes 68a-68g may have an irregular pattern, which may reduce the changes of the system 12 having a false-positive detection. More specifically, the widths $W_b$-$W_f$ of the interior stripes 68b-68f may have an irregular pattern to reduce the chances of a false-positive detection. A false-positive detection may be any detection of a pattern matching the pattern on the seatbelt 50 resulting from the camera 20 imaging something other than the seatbelt 50.

The stripes 68a-68g may be a feature of the material that is woven or otherwise constructed to form the seatbelt 50. The material forming the stripes 68a-68g may extend through the entirety of the seatbelt 50, so the stripes 68a-68g are visible on either of two opposite sides of the seatbelt 50. The stripes 68a-68g include an asymmetric pattern, so the orientation of the seatbelt 50 can be determined based on an image of the pattern of the stripes 68a-68g. One or more twists in the seatbelt 50 can be detected as reversals of the asymmetric pattern of the stripes 68a-68g.

Figure 10:
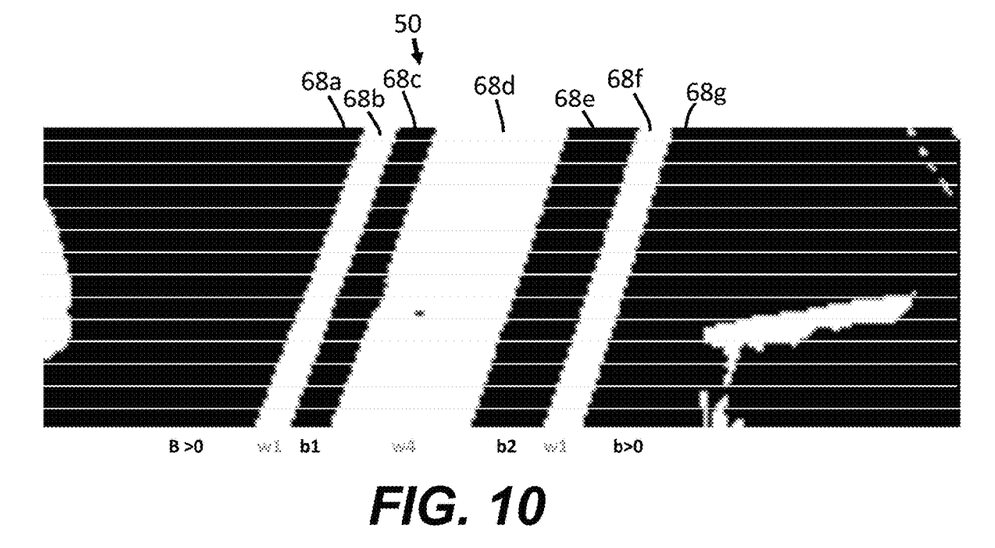
FIG. 10 shows an enlarged section of the Black/White image of FIG. 7C, including the seatbelt and showing horizontal scanning lines, in accordance with the present disclosure.

FIG. 10 shows an enlarged section of the Black/White image of FIG. 7C, including the seatbelt 50 and showing horizontal scanning lines, in accordance with the present disclosure. FIG. 10 illustrates how the system 12 scans across rows of pixels (the horizontal lines) and looks for a series of seven consecutive segments with alternating colors, corresponding to the stripes 68a-68g, and separated by six transition points. The two outermost stripes 68a, 68g can have any width greater than 0 pixels. In other words, the can have any width that is resolvable by the camera 20. The outermost stripes 68a, 68g may function to define an outer edge of the next-adjacent stripes 68b, 68f. The seatbelt 50 may, therefore, include five interior stripes 68b-68f surrounded by the two outermost stripes 68a, 68f. The system 12 may recognize the seatbelt 50 based on the relative widths of the interior stripes 68b-68f. Specifically, the interior stripes 68b-68f may have corresponding widths $W_b$-$W_f$ that vary from one-another to define a pattern of different width ratios. Each row of pixels shown on FIG. 10 may detect the seatbelt based on the pattern indicated at the bottom of the image. Specifically, the system 12 may detect a series of one or more black pixels (b>0) followed by a series of white pixels having a scaled width of 1-unit (w1). Continuing left-to-right, the system 12 may further detect black stripe 68c having a scaled width of 1-unit (b1), then white stripe 68d having a scaled width of 4-units (w4), then black stripe 68e having a scaled width of 2-units (b2), then white stripe 68f having a scaled width of 1-unit (w1), and finally another series of one or more black pixels (b>0).

The ratio of widths of the interior stripes 68b-68f shown on FIG. 10 is 1:1:4:2:1; however, the interior stripes interior stripes 68b-68f may have different widths to define a different ratio. If the detected interior stripes 68b-68f match the ratio of 1:1:4:2:1, within a certain error tolerance, then a horizontal position of the seatbelt 50 within each given scan line may be noted as a detection point. In some embodiments, the accumulated width of the ratio sections of the detection event may be stored together with the detection point. Thus, the system 12 may filter out noise in a given scan line that may otherwise match the ratio of 1:1:4:2:1, but which does not have a total interior width $W_{ti}$ that is within a tolerance of the total interior width $W_{ti}$ of the seatbelt 50, as detected in scan lines that are adjacent or near the given scan line. Using the relative ratios of the widths $W_b$-$W_f$ of the corresponding interior stripes 68b-68f allows the system 12 to detect the seatbelt 50.

Figure 11:
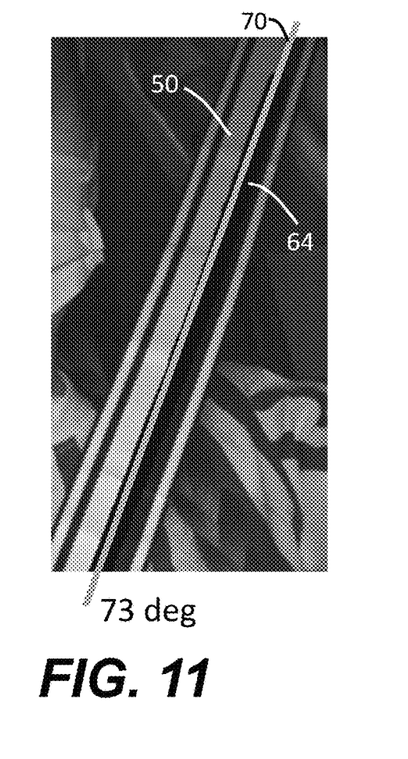
FIG. 11 shows an enlarged section of the image of FIG. 7D, showing a detected angle of the seatbelt, in accordance with the present disclosure.

FIG. 11 shows an enlarged section of the image of FIG. 7D, showing a detected angle 70 of the seatbelt 50. Specifically, FIG. 11 shows how the system 12 recognizes the seatbelt 50 and records its position as detection points 64. Once multiple detection points 64 are accumulated, the angle 70 of the seatbelt 50 can be determined. The angle 70 may represent a tilt of the seatbelt 50 in a longitudinal direction, or a difference in distance from the camera between a higher portion of the seatbelt 50 and a lower portion of the seatbelt 50. A detection point 64 within the first ROI 60, above a shoulder of the occupant 44 represent the higher portion of the seatbelt 50. Similarly, a detection point 64 within the second ROI 62, at the central region of the occupant's 44 torso, may represent the lower portion of the seatbelt 50.

Once the angle 70 is determined, the actual widths of the seatbelt 50 at the detection points 64 can be used to determine a compensated pixel width. For example, with an angle of 73 degrees, a detection point 64 having a pixel width of 100 pixels, as measured by the camera 20, multiplied by the sine of the angle 70 (sin 73 deg.) results in a compensated pixel width of about 95.6 pixels. With a known total interior width $W_{ti}$ of the seatbelt 50, and with details of the camera 20 (e.g. arc-length of pixels), the location of the detection point 64 on the seatbelt 50 can be determined. This distance can provide more accurate measurements regarding the position of the occupant 44 as opposed to conventional methods, such as those that rely upon position of the seat.

Figure 12:
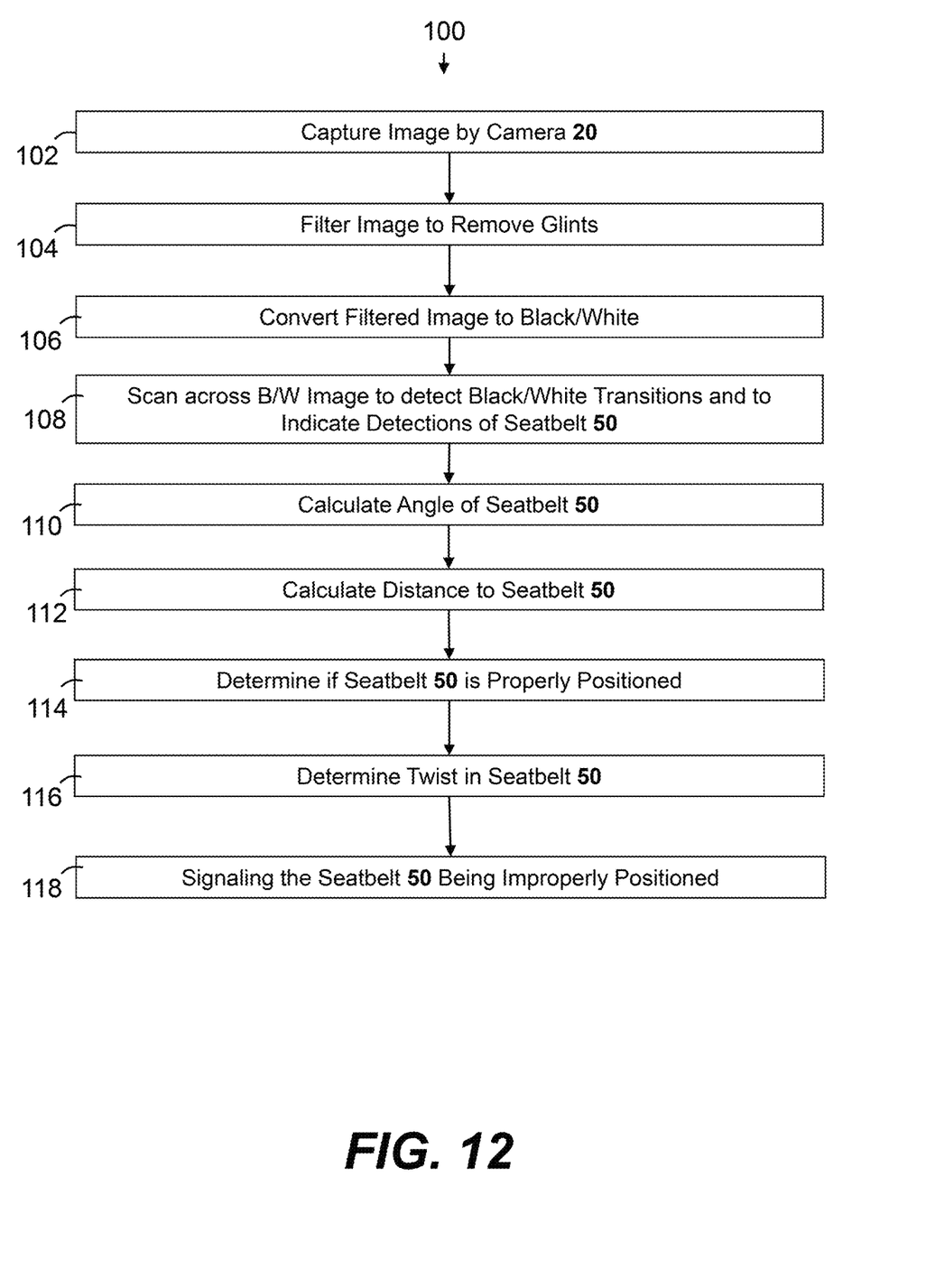
FIG. 12 shows a flowchart listing steps in a method of detecting seatbelt positioning.

A method 100 of detecting seatbelt positioning is shown in the flow chart of FIG. 12. The method 100 includes capturing an image of the occupant 44 by a camera 20 at step 102. Step 102 may include capturing the image in the near infrared (NIR) spectrum, which may include detecting reflected NIR light provided by a near-infrared light source 26. Step 102 may further include transmitting the image, as a video stream or as one or more still images, from the camera 20 to a control system 13 having a processor 30 for additional processing.

The method 100 also includes filtering the image to remove glints at step 104. The processor 30 may perform step 104, which may include applying a median filter to the image. A median filter may preserve edges while smoothing abnormally bright or dark areas (i.e. glints), which may result from seatbelt yarns, bad pixels in the camera 20, or other noise-inducing particles, such as lint stuck to the seatbelt 50. This step 104 reduces the number of false detections of black/white transitions, and thereby improves the performance and reliability of the method 100.

The method 100 also includes converting the filtered image to black-and-white (B/W) at step 106. The terms black and white may include any representations of pixels in one of two binary states representing dark or light. The processor 30 may perform step 106, which may include using a localized binary threshold to determine whether any given pixel in the B/W image should be black or white. Such a localized binary threshold may compare a source pixel in the source image (i.e. the filtered image) to nearby pixels within a predetermined distance of the pixel. If the source pixel is brighter than an average of the nearby pixels, the corresponding pixel in the B/W image may be set to white, and if the source pixel is less bright than the average of the nearby pixels, then the corresponding pixel in the B/W image may be set to black. In some embodiments, the predetermined distance may be about 100 pixels. In some embodiments, the predetermined distance may be equal to or approximately equal to a pixel width of the seatbelt 50 with the seatbelt 50 at a nominal position relative to the camera (e.g. in use on an occupant 44 having a medium build and sitting in the seat 18*a* in an intermediate position.

The method 100 also includes scanning across the B/W image to detect Black/White (or White/Black) transitions and to use detections of those transitions to indicate detections 64 of the seat belt 50 at step 108. The processor 30 may perform step 108, which may include comparing the relative distances between the transitions to determine if those relative distances correlate to a ratio of the widths of interior stripes 68*b*-68*f* of the seatbelt 50, and where they do, marking that location as a detection 64. For example, the processor 30 may be programmed to scan across horizontal lines in the B/W image to detect groupings of transitions spaced apart by distances that match the 1:1:4:2:1 ratio of widths of the interior stripes 68*b*-68*f* shown on FIG. 10. Similarly, the processor 30 may be programmed to detect a reversed ratio of widths of the interior stripes 68*b*-68*f* (i.e. transitions separated by distances that match a 1:2:4:1:1 pattern) to detect the seatbelt 50 at a particular location and with a reversed orientation.

The method 100 also includes calculating an angle of the seatbelt 50 at step 110. The processor 30 may perform step 110, which may include using multiple detection points 64, such as the positions of the seatbelt 50 in two regions of interest (ROIs) 60, 62 to determine an angle 70 of the seatbelt 50. The angle 70 may represent a tilt of the seatbelt 50 in a longitudinal direction, or a difference in distance from the camera between a higher portion of the seatbelt 50 and a lower portion of the seatbelt 50.

The method 100 also includes calculating a distance to the seatbelt 50 at step 112. The processor 30 may perform step 112, which may include using a pixel width of the seatbelt 50 in the ROIs 60, 62. Step 112 may further use the angle of the seatbelt 50, as determined previously, to calculate the distance to the seatbelt 50, such as the distance to the 50 in one or more of the ROIs 60, 62. For example, with an angle of 73 degrees, the processor 30 may determine a pixel width of a detection point 64 to be 100 pixels. The processor 30 may then multiply that pixel width of 100 pixels times by the sine of the angle 70 (sin 73 deg.) to determine compensated pixel width of about 95.6 pixels. With a known total interior width $W_{ti}$ of the seatbelt 50, and with details of the camera 20 (e.g. arc-length of pixels), the processor 30 can calculate the distance between the camera and the detection point 64 of the seatbelt 50. This distance can provide more accurate measurements regarding the position of the occupant 44 as opposed to conventional methods, such as those that rely upon position of the seat.

The method 100 also includes determining if the seatbelt 50 is properly positioned at step 114. The processor 30 may perform step 114, which may include using the angle of the seatbelt 50 and/or the distance to the seatbelt 50. For example, the processor 30 may compute a measured angle of the seatbelt 50 and compare that measured angle to a range of measured values that correspond to proper position of the seatbelt 50. Similarly, the processor 30 may compute one or more distances to the seatbelt 50 and those one or more distances to distances that correspond to a proper positioning of the seatbelt 50. In some embodiments, the processor 30 may compute a rate of change of the distances to determine if the seatbelt 50 is loose as shown, for example, on FIG. 4. The processor 30 may also designate the seatbelt 50 as being improperly positioned if the processor 30 is unable to identify the seatbelt 50 in one or more regions of the image, such as in one or more of the ROIs 60, 62. Examples of such improper positioning are shown in FIGS. 5 and 6.

The method 100 also includes determining if the seatbelt 50 is twisted at step 116. The processor 30 may perform step 116, which may include detecting one or more reversals of an asymmetric pattern on the seatbelt. For example, the processor 30 may designate the seatbelt as being improperly positioned if it detects a number of twists in the seatbelt 50 that exceeds a threshold value for twists.

The method 100 also includes generating a first signal if the system 12 determines that the seatbelt 50 is properly positioned or generating a second signal if the system 12 determines that the seatbelt 50 is improperly positioned at step 118. The processor 30 may perform step 118, which may include providing an enunciation to the occupant 44, such as a sound or display of a warning message. In another example, the processor 30 may signal an output device 28, such as a safety system, to take actions to limit or minimize the functions of the vehicle 10. For example, the vehicle 10 may be prevented from moving or from exceeding a very low speed until and unless the system 12 determines that the seatbelt 50 is properly positioned.

By executing the method of the present disclosure, the seatbelt detection system 12 can determine if the occupant 44 is properly wearing their seatbelt 50. The system and method of the present disclosure can improve the confidence that the occupant 44 is properly wearing the seatbelt 50.

In addition, as stated previously, the seatbelt 50 may have light absorbing and/or reflecting material 50C located on or disposed on the seatbelt 50. The cameras 20A-20F can capture images of the material 50C. As stated before, this material 50C may be in a known pattern having pattern elements that are separated from each other by known distances 52. The seatbelt detection system 12 can then review these captured images from the camera 20A-20F and determine if the distance of the seatbelt 50 to the camera is generally an expected distance indicating that the seatbelt 50 is properly across the body 48 of the occupant 44. In addition, because this pattern is known, clothing that the occupant 44 may be wearing that may reflect and/or absorb light, such as infrared light, can be ignored as it is highly unlikely that the clothing worn by the occupant would have a pattern matching that of the pattern of the stripes 68a-68g on the seatbelt 50.

If a determination is made that the occupant 44 is properly wearing the seatbelt 50, the seatbelt detection system 12 can allow the vehicle 10 to operate in a normal mode. However, if the seatbelt detection system 12 indicates that the occupant 44 is not properly wearing the seatbelt 50, the control system 12 could take any one of a number of different actions. For example, the seatbelt detection system 12 could indicate to the occupant 44 using the output device 28 so as to provide a visual and/or audible cue that the seatbelt 50 is not being properly worn. Additionally, the output device 28 could be in communication with any one of a number of different vehicle systems so as to restrict the operation of the vehicle 10 until the seatbelt 50 is being properly worn by the occupant 44.

The seatbelt detection system 12 may also be in communication with other control systems so as to improve the reliability of the system. For example, the seatbelt detection system 12 may also be in communication with one or more sensors, such as the sensors that detect the safety belt latch 61 or tongue is inserted into the safety belt buckle 63. If the seatbelt detection system 12 determines that the safety belt buckle is properly latched and determines that the seatbelt 50 is properly positioned across the body 48 of the occupant 44, the seatbelt detection system 12 can, with more confidence, determine that the seatbelt 50 is being properly utilized by the occupant 44.

In some embodiments, dedicated hardware implementations, such as application specific integrated circuits, programmable logic arrays, and other hardware devices, can be constructed to implement one or more steps of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A method for detecting seatbelt positioning, comprising:
    capturing, by a camera, a near infrared (NIR) image of an occupant;
    determining, using the NIR image, an angle of the seatbelt;
    converting the NIR image to a black-and-white image;
    scanning across the black-and-white image to detect a detection point having a plurality of transitions between black and white segments corresponding to stripes extending lengthwise along a length of the seatbelt;
    determining a measured width between two of the transitions of the detection point;
    determining a compensated width based on the measured width and the angle of the seatbelt; and
    determining, based on the compensated width and a known width of the seatbelt, a distance between the camera and the seatbelt at the detection point.

2. The method of claim 1, further comprising applying a median filter to the NIR image to remove glints prior to converting the NIR image to the black-and-white image.

3. The method of claim 1, wherein converting the NIR image to the black-and-white image includes using a localized binary threshold to determine whether a given pixel in the black-and-white image should be black or white based on whether a corresponding source pixel within the NIR image is brighter than an average of nearby pixels within a predetermined distance of the corresponding source pixel.

4. The method of claim 3, wherein the predetermined distance is about 100 pixels or wherein the predetermined distance is approximately equal to a pixel width of the seatbelt.

5. The method of claim 1, wherein using the detections of the plurality of transitions to indicate a detection of the seatbelt further comprises comparing relative distances between the transitions to a ratio of the widths of the stripes.

6. The method of claim 1, wherein the widths of the stripes define an asymmetric pattern.

7. The method of claim 6, further comprising:
    determining an orientation of the seatbelt based on an order of the plurality of transitions corresponding to the asymmetric pattern being different based on the orientation of the seatbelt; and determining a twist in the seatbelt based on one or more changes in the orientation of the seatbelt along a length thereof.

8. The method of claim 1, wherein determining the angle of the seatbelt further includes calculating the angle of the seatbelt using detections of the seatbelt in at least two different regions of interest.

9. The method of claim 8, wherein determining the distance between the camera and the seatbelt at the detection point further includes calculating the distance to the seatbelt using a pixel width of the seatbelt in each of the two different regions of interest.

10. The method of claim 9, wherein calculating the distance to the seatbelt further comprises:
calculating a sine of the angle of the seatbelt;
wherein the measured width is a pixel width representing a number of pixels,
wherein determining the compensated width based on the measured width and the angle of the seatbelt includes multiplying the pixel width by the sine of the angle of the seatbelt to determine a compensated pixel width; and
wherein determining the distance between the camera and the seatbelt at the detection point includes calculating the distance to the seatbelt based on the compensated pixel width and a known interior width of the seatbelt.

11. The method of claim 10, wherein the stripes of the seatbelt include a plurality of interior stripes surrounded by outermost stripes on each of two edges along the length of the seatbelt; and
wherein the known interior width of the seatbelt is a total of the widths of the plurality of interior stripes.

12. The method of claim 1, further comprising:
determining if the seatbelt is properly positioned using at least one of the angle of the seatbelt or the distance to the seatbelt; and
generating a signal in response to determining that the seatbelt is properly positioned or in response to determining that the seatbelt is not properly positioned.

13. A system for detecting seatbelt positioning, comprising:
a seatbelt having a plurality of stripes extending lengthwise along a length thereof, the plurality of stripes being arranged in an alternating pattern of bright and dark in near-infrared;
a camera configured to capture a near infrared (NIR) image of an occupant wearing the seatbelt; and
a processor in communication with the camera and programmed to:
receive the NIR image of the occupant wearing the seatbelt,
determine using the NIR image, an angle of the seatbelt,
detect a detection point having a plurality of transitions between black and white segments corresponding to the plurality of stripes extending lengthwise along the length of the seatbelt,
determine a measured width between two of the transitions of the detection point,
determine a compensated width based on the measured width and the angle of the seatbelt, and
determine, based on the compensated width and a known width of the seatbelt, a distance between the camera and the seatbelt at the detection point.

14. The system of claim 13, wherein the processor is further programmed to convert the NIR image to a black-and-white image using a localized binary threshold to determine whether a given pixel in the black-and-white image should be black or white based on whether a corresponding source pixel within the NIR image is brighter than an average of nearby pixels within a predetermined distance of the corresponding source pixel.

15. The system of claim 14, wherein the predetermined distance is about 100 pixels or wherein the predetermined distance is approximately equal to a pixel width of the seatbelt.

16. The system of claim 13, wherein determining the position of the seatbelt based on detecting the transitions corresponding to the alternating pattern of the stripes further comprises comparing relative distances between the transitions to a ratio of widths of the plurality of stripes.

17. The system of claim 13, wherein the widths of the stripes define an asymmetric pattern.

18. The system of claim 13, wherein determining the distance between the camera and the seatbelt at the detection point further includes using a pixel width of the seatbelt and the angle of the seatbelt based upon detections of the seatbelt in each of two different regions of interest within the NIR image.

19. The system of claim 18, wherein the measured width is a pixel width representing a number of pixels,
wherein calculating the distance to the seatbelt comprises further comprises the processor being programmed to:
calculate a sine of the angle of the seatbelt,
wherein determining the compensated width based on the measured width and the angle of the seatbelt includes the processor being further programmed to multiply the pixel width by the sine of the angle of the seatbelt to determine a compensated pixel width, and
wherein determining the distance between the camera and the seatbelt at the detection point includes the processor being further programmed to calculate the distance to the seatbelt based on the compensated pixel width and a known interior width of the seatbelt.

20. The system of claim 13, wherein the processor is further programmed to:
determine if the seatbelt is properly positioned using at least one of the angle of the seatbelt or the distance to the seatbelt; and
generate a signal in response to determining that the seatbelt is properly positioned or in response to determining that the seatbelt is not properly positioned.

* * * * *